United States Patent [19]

Sonderegger et al.

[11] 4,056,009
[45] Nov. 1, 1977

[54] DIAPHRAGM ARRANGEMENT FOR PRESSURE TRANSDUCERS

[75] Inventors: Hans Conrad Sonderegger, Neftenbach; Hans Ulrich Baumgartner, Winterthur, both of Switzerland

[73] Assignee: Kistler Instrumente AG, Switzerland

[21] Appl. No.: 629,987

[22] Filed: Nov. 7, 1975

[30] Foreign Application Priority Data

Nov. 8, 1974 Switzerland ............... 014968/74

[51] Int. Cl.² ..................... G01L 7/08; G01L 9/04
[52] U.S. Cl. ....................... 73/406; 73/398 AR; 92/105; 338/4
[58] Field of Search ............... 73/393, 406, 407 R, 73/398 AR, 408; 92/1, 104, 105

[56] References Cited

U.S. PATENT DOCUMENTS

| | | | |
|---|---|---|---|
| 2,517,056 | 8/1950 | Trubert | 92/104 |
| 3,079,576 | 2/1963 | Koolman | 338/4 |
| 3,079,953 | 3/1963 | Mounteer | 73/406 |
| 3,335,381 | 8/1967 | Giovanni | 338/4 |
| 3,456,509 | 7/1969 | Thordarson | 73/406 |
| 3,505,875 | 4/1970 | Benner, Jr. | 73/407 R |
| 3,645,139 | 2/1972 | Zavoda | 73/406 |

*Primary Examiner*—Donald O. Woodiel
*Attorney, Agent, or Firm*—Craig & Antonelli

[57] ABSTRACT

A diaphragm arrangement is provided for pressure measuring transducer devices wherein the diaphragm includes a structure of the flexible portions thereof permitting stable calibration and compensation of environmental conditions during measurements. In particular, the diaphragm structure includes concentric annular grooves at opposite surfaces of the diaphragm to form at least one annular rim having elastic tubular walls normal to the diaphragm surfaces, thereby providing the flexible portion of the diaphragm. The connection of the diaphragm to the transducer structure is apart from this flexible construction, and the construction can be varied to suit the conditions of usage.

28 Claims, 15 Drawing Figures

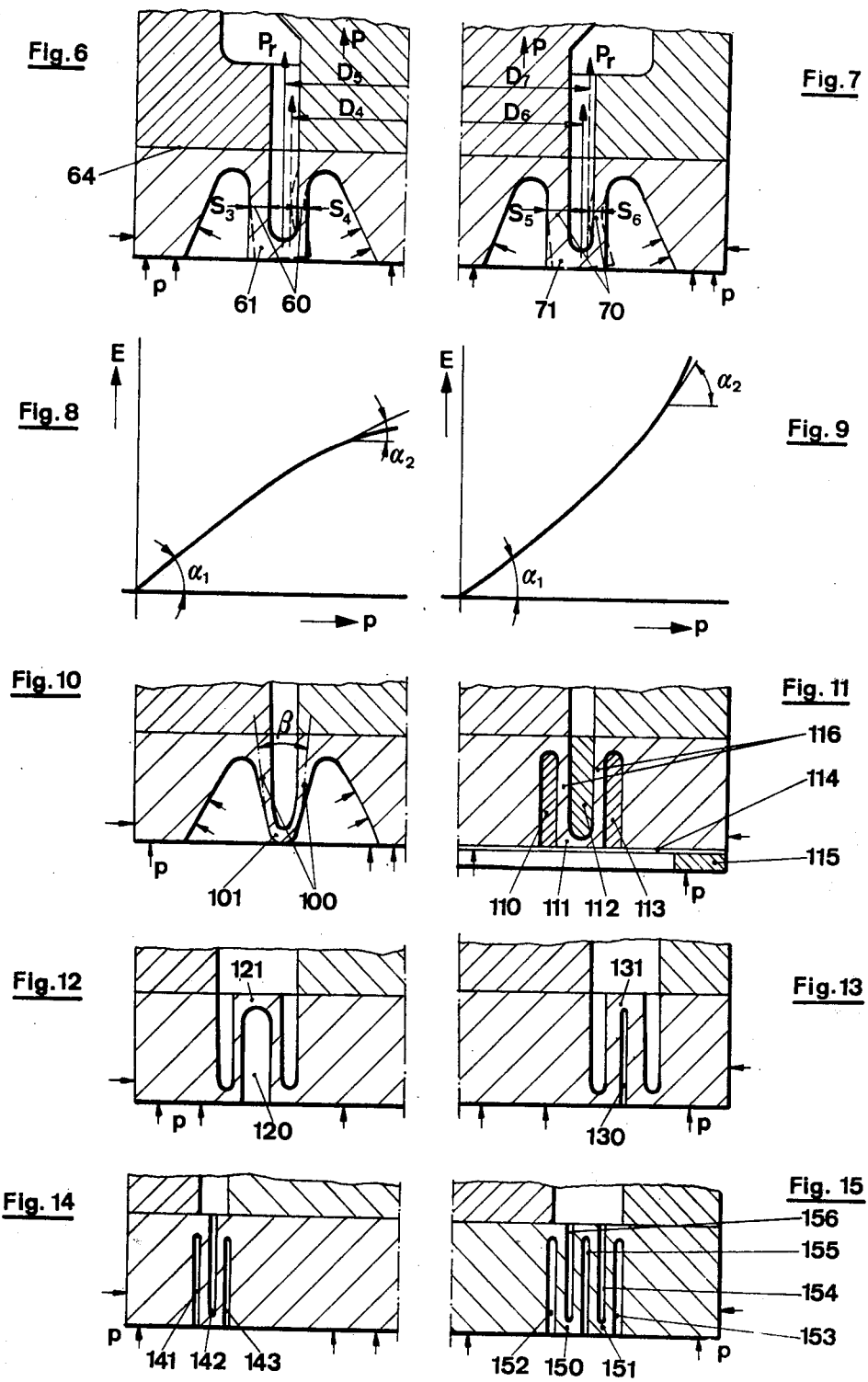

DIAPHRAGM ARRANGEMENT FOR PRESSURE TRANSDUCERS

This invention relates to a diaphragm arrangement for a pressure measuring transducer device, and more particularly, this diaphragm arrangement provides a construction of the flexible portions that achieves stable calibration of the measurements and compensation of the environmental conditions effecting these measurements in operation.

The diaphragm in a pressure transducer is its most crucial part, and it is exposed to the most arduous conditions under usage. Pressure transducers are known to be employed for measuring pressure changes in internal combustion engines, turbines, hydraulic and ballistic systems, rockets, explosive forming machines etc. The gaseous or liquid media with their frequently changing temperature and pressure act on the diaphragm, which has to transmit the resulting force onto a mechano-electric transducing element. Such a transducing element may be piezoelectric, inductive, resistive, piezoresistive or capacitive in its action, and linked by a conductive cable line to electronic amplifiers or bridges, whose output signals are supplied to cathode-ray oscillographs, magnetic tape recorders or electronic recorders.

Because the diaphragm is often exposed simultaneously to rapid temperature and pressure shocks, it must withstand very severe mechanical stressing under continuous operation. In addition, highly corrosive gases are present due to the sulphur content of the fuels. In conventional designs, the diaphragm has been welded to the supporting surface on the body of the transducer, but this has a further disadvantage that the weld is close to the portions of the diaphragm sustaining the severest stresses. As a result, fatigue fractures occur, especially in the immediate proximity of the welds, assisted in part by recrystallization processes. Temperature shocks, such as those imposed by the propagation of the flame front in combustion chambers, cause internal thermal expansion which leads to spurious signals that are superimposed upon the pressure signal. The design of the diaphragm portion of such pressure transducers therefore involves a number of requirements which are difficult to reconcile, and this is one reason why the solutions achieved up to now have been less than satisfactory.

The purpose of the invention is to enable a pressure transducer to be constructed having a stable calibration factor and allowing exact measurements to be performed over a long period of time. In particular, however, the diaphragm arrangement according to the invention enables the pressure behavior to be measured without errors due to temperature shocks acting on the diaphragm portion during measurements. The new diaphragm arrangement will also prevent alteration of the sensitivity of the transducer due to deposits of combustionable residues during continuous operations. The design of the proposed diaphragm arrangement removes the necessary welded joints from the critical zones, where high alternating stresses occur, to zones where less mechanical strength is required, so that a pressure transducer is achieved suitable for continuous operation under extremely arduous conditions.

The invention is illustrated in non-limitative examples by the following figures, wherein FIG. 1 is a cross-sectional view of a pressure transducer with a diaphragm arrangement according to the invention;

FIG. 6 is a cross-sectional view of a diaphragm according to the invention after correcting the inner wall of the rim;

FIG. 7 is a cross-sectional view of a diaphragm according to the invention after correcting the outer wall of the rim;

FIG. 8 illustrates the transducer characteristic of the device according to FIG. 6;

FIG. 9 illustrates the transducer characteristic of the device according to FIG. 7;

FIG. 10 is a cross-sectional view through a variant of the diaphragm arrangement according to the invention;

FIG. 11 is a cross-sectional view through another variant of the diaphragm arrangement according to the invention;

FIG. 12 is a cross-sectional view through a further variant of the diaphragm arrangement according to the invention with tubular elements under tensile stress;

FIG. 13 is a cross-sectional view of the variant in FIG. 12 but with very narrow annular outside gap;

FIG. 14 is a cross-sectional view of the variant in FIG. 1 but with very narrow annular grooves; and FIG. 15 is a cross-sectional view of a diaphragm arrangement according to the invention with double annular rim and very narrow annular grooves.

Figure 1:
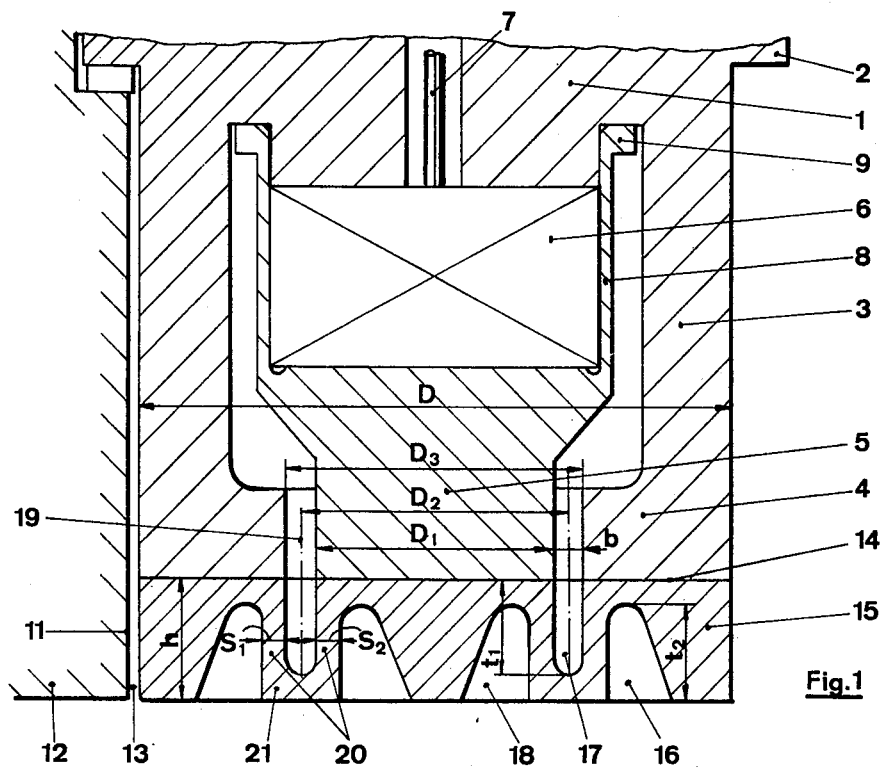

As shown in FIG. 1 a pressure transducer according to the invention consists of the transducer body 1 providing with sealing flange 2. Fixed in the body wall 3 under preload by known means through the elastic sleeve 8 and mounting flange 9 is the force measuring element 6 with the force transmission stub 5. The central signal output cable 7 leads from the force measuring element 6 to a plug not shown, or else it is used directly as the measuring output lead. The force measuring element 6 may employ a piezoelectric, piezoresistive, ohmic, capacitive or inductive system, but there must be a linear correlation between the force applied and the measuring signal and high rigidity in the direction of measuring. This is particularly important for measuring very high dynamic pressures in ballistics and explosive chemistry. The pressure pulses encountered in such applications may reach amplitudes of 100 to 10000 bar, though they usually last only a few milliseconds.

For very high pressure amplitudes, the diameter $D_1$ of the force transmission stub 5 is usually made smaller than that of the force measuring element 6. The inside diameter of wall 3 of the transducer body 1 is also tapered in such cases to the diameter $D_3$ of the supporting flange 4. With the dimensioning of this flange the elasticity of the annular body wall 3 can be largely adapted to the assembly comprising the force transmission stub 5 and force measuring element 6.

The diaphragm 15 according to the invention is constructed in a unitary one piece structure and consists of a disk machined flat on both sides, although it may also be produced from sections joined together by conventional techniques to form a unitary structure. The diaphragm 15 is joined in a known manner to a supporting flange and the force transmission stub 5 at the diaphragm supporting flange 14 which also lies in the same plane apart from the flexible portions of the diaphragm. The central annular groove 17 of the diaphragm 15 mates with the annular gap 19 between force transmission stub 5 and supporting flange 4 of the transducer body. The thickness "$h$" of the diaphragm 15 is in a predetermined ratio to the diameter D of the body wall 3, and depends also on the maximum pressure '$p$' and the manufacturing process. A ratio of about 1:5 is employed in the drawings, but this is not mandatory.

The principal feature of the diaphragm arrangement according to the invention lies in the attainment of the requisite elasticity of the diaphragm while maintaining high pressure resistance. This is accomplished according to the invention by appropriate design of the outer annular groove 16, the central annular groove 17 and inner annular groove 18. Depending on the dimensions of the three grooves 16, 17 and 18 according to the invention, an annular rim 21 results with elastic tubular elements 20, having dimensions exactly defined by the wall thicknesses $S_1$ and $S_2$ and easily reproducible.

The three annular grooves according to the invention may be produced by mechanical, chemical, electrochemical or other machining techniques. Depending on the machining depth $t_1$ and $t_2$ of the annular grooves, the elastic length of the annular rims 21 can be matched to particular requirements. Further adaptation of the elasticity can be obtained by varying the thickness $S_1$ and $S_2$ of the elastic tubular elements 20. The wall thicknesses $S_1$ and $S_2$ do not have to be equal in every case. By employing special production methods, the annular grooves can be made deep.

Figure 2:
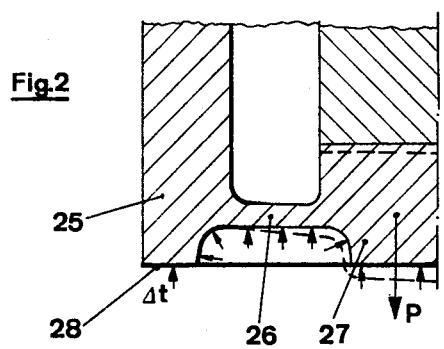
FIG. 2 is a cross-sectional view of a conventionally available diaphragm arrangement under the influence of a very rapid temperature rise.

FIG. 2 shows a diagrammatic portion of a conventional pressure transducer for comparison. Between the outer ring 25 and the central part 27 (shown in partial cross-section), the annular plate diaphragm 26 is arranged parallel with the diaphragm surface in the usual manner. Under the effect of a temperature shock $\Delta t$, the plate diaphragm 26 tends to bulge outwardly toward the medium being measured, so that a relieving force P acts on the central part 27, and therefore, on the force measuring element. This relieving force P is superimposed, as an error signal, upon the pressure signal occurring concurrently. As a result the measured pressure is less than the real value. Because such distortions may remain effective much longer than the pressure event associated with them, undesirable zero drifts may be also superimposed on the measuring signal.

Figure 3:
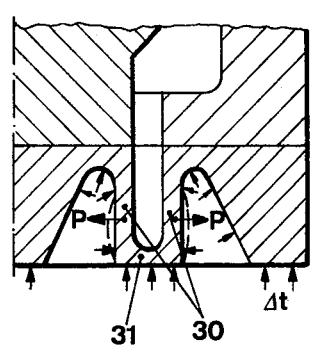
FIG. 3 is a cross-sectional view of a diaphragm arrangement according to the invention under the influence of a very rapid temperature rise.

FIG. 3 shows a similar diaphragm portion as in FIG. 2, but with a diaphragm arrangement according to the invention acting under the same conditions. Under the temperature shock $\Delta t$, the elastic walls 30 of the rim 31 bulge outwardly against the medium being measured. The resulting forces P are in equilibrium, however, so that practically no disturbing force acts on the force measuring element in the axial direction. An explosion process can be thus registered without any error caused by a simultaneous temperature rise in the medium being measured. The double-walled arrangement of the tubular elastic elements 30, which are normal or nearly normal to the diaphragm surface, thus compensate temperature influences from the medium to a large extent in accordance with the present invention.

Figure 4:
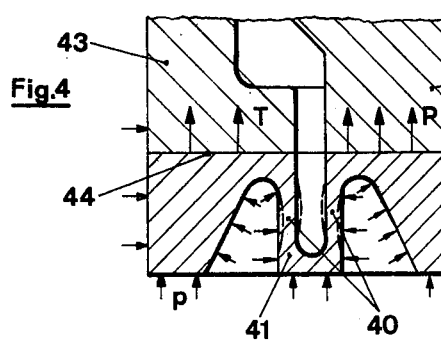
FIG. 4 is a cross-sectional view of a diaphragm arrangement according to the invention under the influence of a pressure 'p' of a medium.

FIG. 4 shows a diaphragm arrangement according to the invention under the influence of a medium exerting the pressure '$p$'. The longitudinal elasticity of the body wall 43 is matched ideally to the transmission part 45 and the force measuring element (not shown), so that the diaphragm surfaces 44 lie in the same plane. The only deformation is the slight flexing of the elastic tubular elements 40 of the rim 41 toward each other. The medium pressure '$p$' is divided into the measuring force P and the supporting force T. A linear correlation between '$p$' and P is assured, so that the ideal state is achieved.

Figure 5:
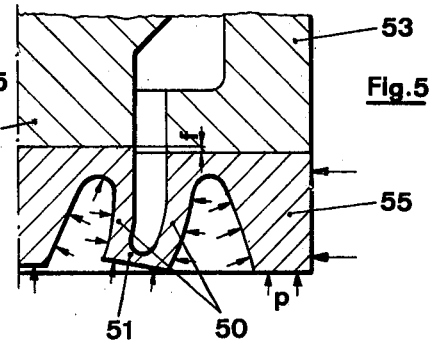
FIG. 5 is a cross-sectional view of a diaphragm arrangement according to the invention under a pressure 'p' of a medium with very severe deformation.

FIG. 5 shows a deviation from the ideal state, greatly enlarged. The elasticities of the annular body 53 in relation to the transmission stub 55 and the force measuring element are matched so that under the operating pressure '$p$' the depression '$f$' amounts to a few microns. The rim 51 with its elastic tubular elements 50 is quite capable of this accommodation. If however this depression '$f$' exceeds a certain amount, 10 microns, for example, the deflection of the rim 51 causes the supporting point to be displaced, as shown in FIG. 5, so that the linear correlation between '$p$' and P is altered. Such errors can however be eliminated by means of a correction which can be applied to the assembled transducer, as will be explained in the following figures.

FIG. 6 shows a detail section of a diaphragm arrangement according to the invention under an operating pressure '$p$', which eliminates depression of the diaphragm surface 64. The wall thicknesses of the elastic tubular elements 60 of the annular rim 61 are unequal, the inner wall $S_4$ being appreciably thinner than the outer wall $S_3$ for example. As a result the annular rim 61 bends slightly inwardly. This bending change causes the position of the total force vector Pr to move inwardly from the diameter $D_5$ to the diameter $D_4$, so that the measured force P increases degressively with increasing pressure '$p$'.

FIG. 7 shows an opposite correction to that of FIG. 6. Here the outer wall $S_6$ of the elastic tubular elements 70 has been made much thinner, causing the annular rim 71 to move outwardly under increasing pressure '$p$', so that the total force vector Pr is likewise displaced outwardly from $D_6$ to $D_7$. As a result, the measured force P increases progressively with increasing pressure '$p$'.

FIG. 8 shows the transducer characteristic for the arrangement of FIG. 6. Correction of the inner wall of the annular rim according to FIG. 6 causes the calibration curve to flatten, i.e. a reduction of the slope from $\alpha 1$ to $\alpha 2$ is achieved. The ordinate E represents the sensitivity, pC/bar or mV/bar for example, while the abscissa represents the pressures range for '$p$' in bars for instance.

FIG. 9 shows the transducer characteristic for the arrangement of FIG. 7. Correction of the outer wall of the annular rim in this arrangement causes the calibration curve to steepen, i.e. an increase of the slope from $\alpha 1$ to $\alpha 2$ is achieved.

FIG. 10 shows a variant of the arrangement of FIG. 1 with the parallel walls of the elastic tubular elements 20 in FIG. 1 now being instead at an angle $\beta$. Thus, the tubular elements 100 in FIG. 10 have non-parallel walls, but otherwise the annular rim is of a similar geometry to the diaphragm arrangement shown in FIG. 1.

FIG. 11 shows another variation of the diaphragm arrangement according to the invention in which the central annular groove 112 is packed with a body of filling material so that undesirable flexing of the elastic tubular elements 116 is prevented. In order to protect the inner and outer annular grooves 110, 113 against accumulation of combustion residues, they can be filled with an elastic metal such as lead or tin, or with suitable plastic materials, etc. In addition, however, it is also possible to cover the exposed diaphragm surface with a thin metal foil 114, which is directly joined to the diaphragm plate or fixed onto the diaphragm by methods using a ring 115.

FIG. 12 shows a further arrangement according to the invention, with the diaphragm plate turned over by 180° as compared with that in FIG. 1. The central groove now opens toward the medium being measured, while the annular rim faces toward the transducer. The advantages previously described with respect to the invention are retained in this embodiment.

FIG. 13 shows a variant of FIG. 12 in accordance with the invention. Here the central annular groove 130 of the annular rim 131, facing toward the medium, is formed as a thin annular gap. Such shapes can be conveniently produced by chemical means, spark erosion or welding techniques, employing existing methods. Such narrow grooves are particularly suited for filling with semi-elastic materials, as in the example of FIG. 11, above.

FIG. 14 shows a further variation according to the invention of the embodiment of FIG. 1. In this arrangement, all three grooves 141, 142 and 143 are made very narrow and deep employing such processes as previously mentioned with respect to FIG. 13. Here again various machining techniques may be employed to achieve a unitary structure for the diaphragm plate.

FIG. 15 shows another embodiment of the diaphragm arrangement according to the invention. This diaphragm arrangement includes more than one annular rim disposed concentrically with respect to one another. In the illustration, there are two annular rims 150 and 151 having an annular groove 155 therebetween, together with respective central annular grooves 156, 154 and outer and inner annular grooves 152, 153. This arrangement gives a particularly high flexural elasticity for the diaphragm, together with high compressive strength. The very compact geometry having narrow grooves further allows two or more annular rims to be arranged concentrically, again using the methods previously mentioned.

The diaphragm arrangement according to the invention, illustrated in the figures, opens up new possibilities because the flexible elastic parts of the diaphragm are no longer parallel to the diaphragm surface as conventionally known but approximately normal or perpendicular thereto. By arranging at least two tubular elastic parts in opposition to each other according to the invention, temperature effects from the medium side of the diaphragm cancel themselves out almost completely. By giving the elastic tubular elements unequal thicknessess according to the invention, it is possible to influence the calibration curves of the pressure transducers, so that the linearity may be corrected on assembled transducers by remachining in stages. By employing new machining techniques in this invention, it is possible to produce deep, narrow grooves in both sides of the diaphragm surface which are exactly repeatable and provide fully defined supporting points for the force transmission surfaces.

It has been demonstrated that the measured results of the arrangement of the invention are not altered when the outer grooves become filled with combustion residues. On the other hand, it is quite easy to prevent such filling according to the invention by filling the grooves with certain materials. Due to the large adhesion surfaces, there is little danger of the filling material, whether metals or ceramic-bound plastics, detaching themselves from the grooves. Further, it is also quite possible according to the invention to cover the face of the diaphragm with a thin metal foil, which may be flat or slightly corrugated. By arranging a plurality of annular rims concentrically according to the invention, almost any desired elasticity for the diaphragm can be obtained. The invention thus creates many new possibilities for accurate measurements with pressure transducers, and permits long-life repeatable measurements of high-amplitude pressure phenomena accompanied by high temperature shocks.

While We have shown and described several embodiments in accordance with the present invention, it is understood that the same is not limited thereto but is susceptible of numerous changes and modifications as known to a person skilled in the art, and We therefore do not wish to be limited to the details shown and described herein but intend to cover all such changes and modifications as are obvious to one of ordinary skill in the art.

We claim:

1. Diaphragm arrangement for pressure transducers comprising
   a diaphragm plate having first and second parallel major surfaces,
   a plurality of annular concentric first grooves formed within said diaphragm plate at said first major surface to a depth less than the thickness of the plate,
   at least one second annular groove formed within said diaphragm plate at said second major surface to a depth less than the thickness of said plate, said second annular groove being formed concentrically between at least two of said first grooves in said first surface with two concentric annular elastic walls being formed between said first and second grooves, and
   an annular rim connecting said two annular elastic walls at the end thereof which is substantially coplanar with said first major surface.

2. Diaphragm arrangement according to claim 1, wherein said elastic walls are arranged to be reconstructed such that a predetermined flexibility of said diaphragm plate can be provided by said elastic walls.

3. Diaphragm arrangement according to claim 1, wherein said elastic walls are substantially perpendicular to said first and second major surfaces.

4. Diaphragm arrangement according to claim 1, wherein said diaphragm plate is a unitary one-piece structure with said elastic walls and said annular rim.

5. Diaphragm arrangement according to claim 1, wherein said elastic walls have approximately the same thickness.

6. Diaphragm arrangement according to claim 1, wherein said first and second grooves in said respective first and second major surfaces each have predetermined width and depth dimensions.

7. Diaphragm arrangement according to claim 6, wherein said first and second grooves have substantially different width dimensions.

8. In a pressure transducer system comprising a housing having walls, a transducing element mounted within said housing, a force transmission member mounted within said housing at an annular separation from said walls for transmitting forces to said transducing element, and a diaphragm mounted on an end of said housing in contact with said force transmission member for imparting pressure values of a pressure medium to said force transmission member, the improvement comprising said diaphragm including

- a diaphragm plate having first and second parallel major surfaces, said first major surface facing said pressure medium and said second major surface contacting surfaces of said housing walls and said force transmission member respectively,
- a plurality of annular concentric first grooves formed within said diaphragm plate in said first major surface to a depth less than the thickness of the plate,
- at least one second annular groove formed within said diaphragm plate in said second major surface to a depth less than the thickness of said plate, said second annular groove being formed concentrically with at least two of said first grooves in said first surface with two concentric annular elastic walls being formed between said first and second grooves, and
- an annular rim connecting said two annular elastic walls, said annular rim having an end surface which is coplanar with said first major surface.

9. A pressure transducer system according to claim 8, wherein said elastic walls are arranged to be restructured after mounting said diaphragm on said housing such that transducer characteristics can be calibrated.

10. A pressure transducer system according to claim 8, wherein said first and second concentric annular grooves are formed by at least one of mechanical machining, spark erosion, chemical machining and metallurgical machining.

11. A pressure transducer system according to claim 8, wherein said force transmission member and said transducing element have longitudinal elastic characteristics relative to said housing walls such that said diaphragm is flexed at said force transmission member relative to said housing walls to a longitudinal distance at most equal to 5 microns.

12. A pressure transducer system according to claim 8, wherein said second annular groove mates with said annular separation between said force transmission member and said housing walls.

13. A pressure transducer system according to claim 12, wherein said annular separation and said second annular groove mating therewith have essentially the same diametric dimensions.

14. A pressure transducer system according to claim 8, wherein said second major surface of said diaphragm plate which faces away from the pressure medium mates with said surface of said force transmission member and said housing walls in a single common plane.

15. A pressure transducer system according to claim 8, wherein said elastic walls are substantially perpendicular to said first and second major surfaces.

16. A pressure transducer system according to claim 8, wherein said elastic walls have approximately the same thickness.

17. A pressure transducer system according to claim 8, wherein said first and second grooves in said respective first and second major surfaces each having predetermined width and depth dimensions.

18. A pressure transducer system according to claim 17, wherein said first and second grooves have substantially different width dimensions.

19. A pressure transducer system according to claim 17, wherein each of said first and second grooves has approximately the same width dimension.

20. A pressure transducer system according to claim 8, wherein said elastic walls include portions converging toward one another at a predetermined angle $\beta$.

21. A pressure transducer system according to claim 8, wherein at least one of said first and second grooves contains a slightly elastic material for controlling the yielding of said elastic walls.

22. A pressure transducer system according to claim 21, wherein said elastic material contained in said grooves is a heat insulating material selected from the group consisting of an elastic metal or plastic material.

23. A pressure transducer system according to claim 22, wherein said annular grooves containing said elastic material are covered by a metal foil, said metal foil being connected to said diaphragm plate by a ring member.

24. A pressure transducer system according to claim 8, wherein said elastic walls have different thicknesses.

25. A pressure transducer system according to claim 8, wherein said plurality of grooves define a plurality of pairs of elastic walls.

26. A pressure transducer system according to claim 8, wherein said diaphragm plate is a unitary one-piece structure with said elastic walls and said annular rim.

27. A pressure transducer including a force measuring element inserted in a tubular housing having a force transmitting surface coplanar with an end surface of the housing and a plate-shaped diaphragm covering an annular gap between the housing and the force measuring element, said diaphragm being in contact flush with the end face of the housing and the force transmitting surface for the force measuring element, characterized in that the diaphragm has, in the zone of the annular gap, at least one coaxial annular groove open toward the annular gap, said groove extending between two concentric annular grooves at the other side of the diaphragm, wherein walls formed between the mutually concentric grooves are formed in the shape of coaxial cylinders.

28. A pressure transducer according to claim 27, wherein the walls between the annular grooves have the same thickness.

* * * * *